US007767947B2

(12) United States Patent
Downing, Jr.

(10) Patent No.: US 7,767,947 B2
(45) Date of Patent: Aug. 3, 2010

(54) SEMICONDUCTOR LIGHT SOURCE WITH OPTICAL FEEDBACK

(76) Inventor: John P. Downing, Jr., 260 Kala Heights Dr., Port Townsend, WA (US) 98368

( * ) Notice: Subject to any disclaimer, the term of this patent is extended or adjusted under 35 U.S.C. 154(b) by 762 days.

(21) Appl. No.: 11/229,709

(22) Filed: Sep. 20, 2005

(65) Prior Publication Data

US 2007/0063125 A1 Mar. 22, 2007

(51) Int. Cl.
G01J 1/32 (2006.01)
H01S 3/13 (2006.01)
(52) U.S. Cl. .......................... 250/205; 250/225; 372/31
(58) Field of Classification Search ................. 250/205, 250/225; 372/29.011, 29.014, 29.02, 29.021, 372/31, 33
See application file for complete search history.

(56) References Cited

U.S. PATENT DOCUMENTS 5,250,797 A 10/1993 Sano et al.

(Continued)

OTHER PUBLICATIONS

Optek, Vertical Cavity Surface Emitting Laser in TO-46 Package, Sep. 2003.

(Continued)

Primary Examiner—Stephen Yam
(74) Attorney, Agent, or Firm—Donald W. Marks (57) ABSTRACT

A semiconductor light source with optical feedback includes a vertical member extending upward from an upper horizontal surface of a header parallel to a vertical beam projected from a semiconductor light-emitting element mounted on the horizontal surface of the header wherein the vertical member supports a light-sensing element for receiving light reflected transversely from the vertical beam by a beam splitter supported by the vertical member. The vertical beam passing through the beam splitter passes through a window or filter in a cap mounted on the header and covering the light-emitting element, the light-sensing element, the beam splitter, and the vertical member. Substantially all of the transversely reflected light impinges on the light-sensing element and can be used to control the power to the light-emitting element. A simple lens can by used to collimate the beam. Interior portions of the unit are formed from light absorbing materials such as black ceramic, black plastic, anodized aluminum, etc. The combined effect of the non-reflective interior of the assembly, the orientation of the photo-diode to have an acceptance cone perpendicular to the beam axis, the small entrance pupil, and the optical filter reduces ambient radiation in the unit by as much as −75 dB of the level outside the device. This reduces noise and drift in the automatic power control loop to produce constant intensity in the output light beam.

20 Claims, 6 Drawing Sheets

U.S. PATENT DOCUMENTS

| | | | |
|---|---|---|---|
| 5,771,254 A * | 6/1998 | Baldwin et al. | 372/31 |
| 5,809,050 A * | 9/1998 | Baldwin et al. | 372/50.21 |
| 5,812,582 A | 9/1998 | Gilliland et al. | |
| 5,812,717 A | 9/1998 | Gilliland | |
| 5,835,514 A * | 11/1998 | Yuen et al. | 372/36 |
| 6,049,073 A | 4/2000 | Roddy et al. | |
| 6,350,978 B1 | 2/2002 | Kasai | |
| 6,392,215 B1 | 5/2002 | Baumgartner et al. | |
| 6,396,858 B2 | 5/2002 | Kawakami et al. | |
| 6,527,460 B2 | 3/2003 | Cohen et al. | |
| 6,534,756 B1 | 3/2003 | Grimbergen | |
| 6,586,678 B1 | 7/2003 | Rosenberg et al. | |
| 6,587,471 B1 * | 7/2003 | Bass et al. | 370/432 |
| 6,596,977 B2 | 7/2003 | Muthu et al. | |
| 6,720,544 B2 | 4/2004 | Barna et al. | |
| 6,787,748 B2 | 9/2004 | Suzuki | |
| 2003/0066946 A1 | 4/2003 | Grimbergen | |
| 2003/0116695 A1 | 6/2003 | Masuda et al. | |

OTHER PUBLICATIONS

Vertilas, Vertilas VCSEL Laser Diodes, Nov. 30, 2004.

* cited by examiner

SEMICONDUCTOR LIGHT SOURCE WITH OPTICAL FEEDBACK

BACKGROUND OF THE INVENTION

Semiconductor light sources, including: light-emitting diodes (LED), infrared-emitting diodes (IRED), edge-emitting laser diodes (LD) and vertical-cavity, surface-emitting lasers (VCSEL), are used in most data-transmission and storage systems and in many sensors for measuring gas and fluid properties and detecting proximity and distance. Light emission is stimulated by passing an electrical current through the semiconductor. The efficiencies of these sources, expressed in Watts (W) of light power per Ampere (A) of excitation current (for one W of output at 25° C.), range from about 0.03 for LDs to 0.2 for VCSELs. Light-emitting diodes and IREDs emit incoherent light from all sides of the semiconductor chip and therefore required reflective packaging and collimating optics to direct the emitted light toward transmission devices or fluid samples. A typical laser diode has a semiconductor chip with reflecting front and back facets. Lasing causes emission of coherent, polarized light from both facets in elliptical beams with typical divergences of 120° (full width at half maximum intensity, FWHM). Approximately 10 to 50% of the generated light passes through the back facet to a monitoring photodiode (MD) unavailable for data transmission or sensing (e.g., purposes other than light power control). The light beam from an edge-emitting laser diode is an elliptical cone and a special optic is required to circularize and collimate it. A VCSEL emits a roughly circular, coherent, polarized light beam, with divergence of about 6 to 19°, depending upon the manufacturer, from an array of Bragg reflectors contained in a 5 μm to 20 ∞m on the semiconductor chip. A VCSEL requires only an inexpensive beam-forming optic (BFO) to produce a round collimated beam.

The amount of light a semiconductor source emits depends on the current passing through the device as well as its temperature and its age. Typically the efficiency ($W \times A^{-1}$) will decline with temperature and age. The temperature effect is expressed by the temperature coefficient (t.c.) which is the percent change in light output per unit change of device temperature. The temperature coefficients of semiconductor light sources range from about −1 to −0.5% per degree C. The temperature coefficient can be measured and compensated whereas aging effects are random and unpredictable. Aging typically reduces LED brightness by about 5% per decade of time. Various methods are employed to control the radiated power from semiconductor light sources. One common method is automatic power control (APC) wherein the energizing current to the semiconductor light source is controlled in accordance with a light intensity generated by the semiconductor. In another method, the energizing current can be regulated in accordance with a temperature sensed in the vicinity of the semiconductor.

In sensors such as fluid property sensors, accurate control of optical power incident on a fluid sample is critical. For example turbidity sensors such as that disclosed in U.S. Pat. No. 4,841,157 have light-emitting diodes (LED) or infrared-emitting diodes (IRED). The light-generating current is controlled by a temperature sensor located close to the source. This scheme can reduce the temperature coefficient effect of an LED or an IRED to a few hundredths of one percent per degree C. but it cannot compensate for diminished brightness with device age.

Laser diode light sources often employ monitoring photodiodes (MD), which sense a portion of the light emitted from the LD to control the current to the light-emitting semiconductor. The MD is positioned to measure light intensity from the back facet to control the drive current and thus light emitted from the front and back facets of the chip. This APC system works exceptionally well as long as the ratio of the reflectivities of the front and back facets remains the same. A shift in this ratio as a result of thermal damage, however, will produce power-control errors. Moreover, internal and external reflections, and ambient light create spurious MD photocurrent noise in the APC circuit.

Light-emitting diodes with automatic power control by sensed light intensity are used in telecom systems and sensor applications. A portion of the light can be monitored by an MD mounted adjacent to the chip. While most of the light impinging on the MD comes directly from the LED chip, the MD receives some light reflected from the package and some ambient light passing into the LED package through the window glass. The light received by the MD is converted to photocurrent and used by the APC circuit to control the quantity of emitted light. The reflected and ambient light is an error in the APC system and in daylight, the error can be substantial.

Typical APC VCSELs have an MD mounted adjacent to the laser chip to measure reflection from the window glass or lens. This efficient scheme uses less than 10% of the total radiated power for automatic power control and delivers the rest to a light-transmission device. The automatic power control of a VCSEL is subject to error from ambient light illuminating the MD and from changes in power level and device temperature. This error can be large in sensor applications where the MD is exposed to ambient light. The spatial pattern of radiant intensity in a VCSEL beam varies from one device to another and changes with changes in power level and device temperature.

There exists a need for an APC light source which has improved power-control accuracy, which is efficient in use of electrical power to produce light, which is insensitive to ambient light, device age and changes in device temperature, and which uses simple collimating optics.

BRIEF SUMMARY OF THE INVENTION

The present invention is summarized in a semiconductor light source with optical feedback which includes a vertical member extending upward from an upper horizontal surface of a header parallel to a vertical beam projected from a semiconductor light-emitting element mounted on the horizontal surface of the header wherein the vertical member supports a light-sensing element for receiving light reflected transversely from the vertical beam by a beam splitter supported by the vertical member. The vertical beam passing through the beam splitter passes through a window in a cap mounted on the header and covering the light-emitting element, the light-sensing element, the beam splitter, and the vertical member. Ambient light entering the window generally fails to impinge on the light-sensing element at an angle sufficient to penetrate the sensing regions of the light-sensing element.

In one particular embodiment, a polarization-locked VCSEL is the light-emitting element and substantially all of the transversely reflected light impinges upon the active region of the light-sensing element to prevent error due to changes in spatial intensity in the VCSEL beam caused by temperature or power changes.

Further reduction in susceptibility to ambient light can be promoted by providing surfaces or elements, such as black surfaces or elements, having light adsorbing properties and by minimizing the diameter of the entrance pupil and making the cap height at least five times the diameter of the entrance pupil.

In one embodiment, the beam splitter is a plate, such as a Fresnel plate, mounted at an acute angle, such as 45°, to the upper horizontal surface of the header and the vertical member.

In another aspect of the invention, a groove is formed in the top horizontal surface to receive an edge of a beam splitter plate to assist in positioning the beam splitter plate.

In a further aspect of the invention, the upper edge of the vertical member is beveled for positioning and mounting the beam splitter plate.

In a still further aspect of the invention, one or more black ceramic or plastic plates can be mounted on the header with the vertical member being black ceramic or plastic and integral to one of the plates.

Other objects, advantages and features of the invention will be apparent from the following detailed description of the invention and the accompanying drawings.

DETAILED DESCRIPTION OF THE INVENTION

Figure 1:
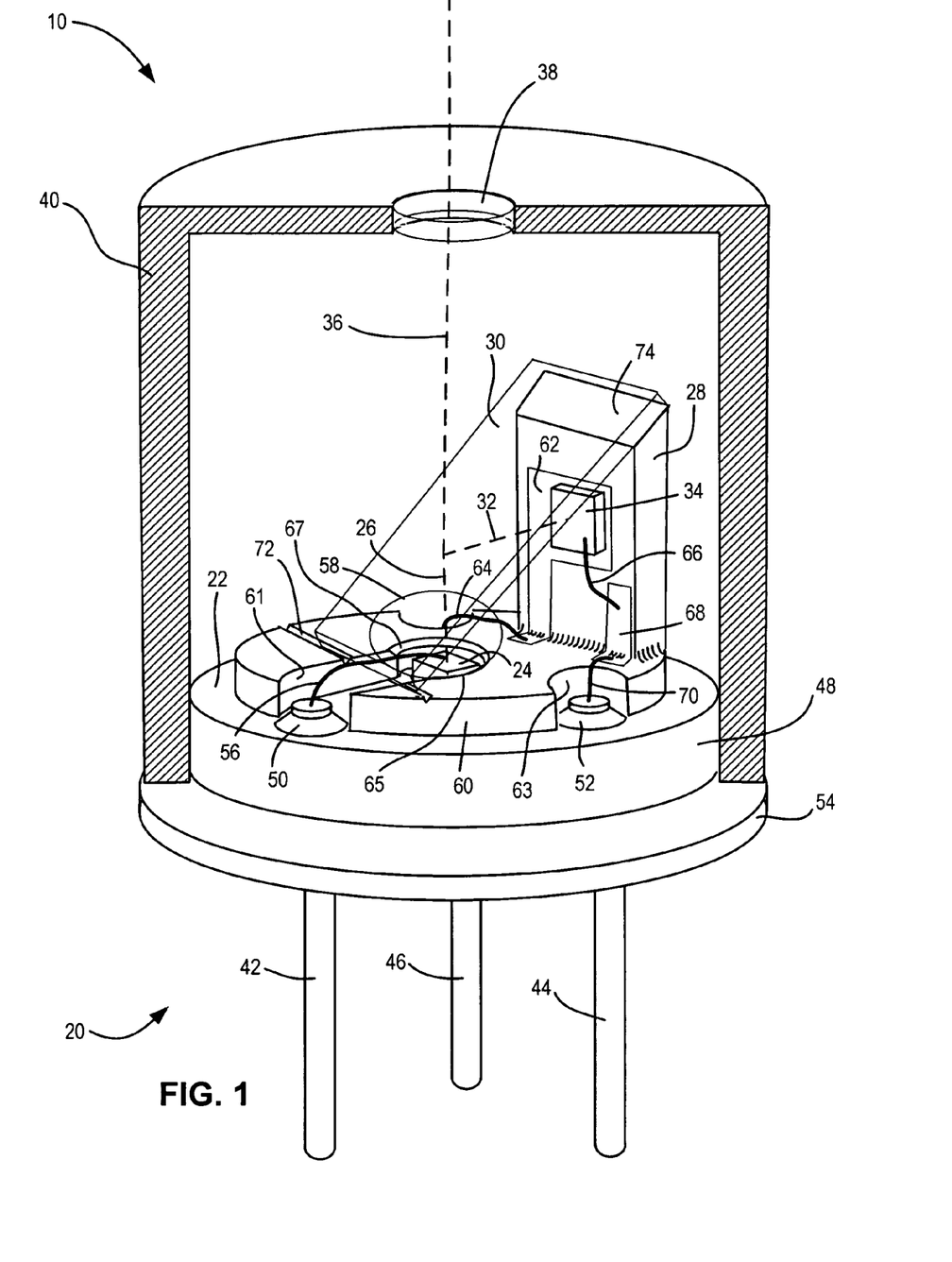
FIG. 1 is a perspective view, with portions cut away, of a semiconductor light source with optical feedback in accordance with the invention.

As shown in FIG. 1, one embodiment of a semiconductor light source unit 10 with optical feedback includes a header 20 having an upper horizontal surface 22 upon which is mounted a light-emitting element 24 for projecting a vertical beam of light 26. A vertical member 28 extends upward parallel to the beam 26. A beam splitter 30 is supported at least on one end by the vertical member 28 and extends over the light-emitting element 24 for reflecting a portion of the beam 26 to form a beam portion 32 which is transverse to the beam 26. A light-sensing element 34 is mounted on vertical member 28 for receiving the transverse beam portion 32. The light-sensing element 34 is mounted so that its acceptance cone is oriented at about 90° to the light beam 26 and so the active light sensing region of the light-sensing element receives substantially all of the transversely reflected beam portion 32. The non-reflected portion 36 of the beam 26 passes through the beam splitter 30 and a window 38 of a cap 40 enclosing the unit. One advantage of this structure over the prior art is that ambient light entering the unit through window 38 is at least partially prevented from impinging and penetrating the light-sensing element 34 by the beam splitter 36. Additionally ambient light passing through the beam splitter 36 would impinge on the surface of the light-sensing element at an angle insufficient to penetrate to a active region of the light-sensing element, i.e., outside of the acceptance cone of the light-sensing element 34. Thus the semiconductor light source with optical feedback in accordance with the invention has substantially reduced susceptibility to ambient light affecting automatic power control of the intensity of the emitted beam of light 36 and to changes in spatial pattern in the cross-section of radiation intensity of the emitted beam of light 36.

The header 20 is a conventional header used in forming semiconductor devices and has at least three leads 42, 44 and 46 wherein the leads 42 and 44 are insulated from a metal base 48 by respective glass sleeves 50 and 52. The common lead 46 in this embodiment is joined to the metal base 48 but alternatively could be insulated and extend through the base 48 in the manner of the leads 42 and 44. The base 48 has a flange 54 to which the cap 40 is bonded; the cap 40 can be mounted on the base by any other alternative structure. The base 48 can be plated with gold and the light-emitting element 24 is bonded directly on the base, such as by a conductive epoxy, with the cathode electrode thereof joined to the base 48 and thus to the common lead 46. Typically, the base 48 is a kovar nickel-iron alloy having temperature expansion coefficient similar to glass and silicon. A wire 56 connects the lead 42 to the anode electrode of the light-emitting element 24. A collimating lens 58 is positioned over the light-emitting element 24 to form the light output of the element 24 into a collimated narrow beam.

The vertical member 28, in the embodiment of FIG. 1, is integral with or bonded on a horizontal disk 60 which is bonded on the upper surface 22 of the header 20 such as by epoxy. The vertical member 28 and the disk 60 can be ceramic, plastic or other suitable material. In one embodiment, the member 28 and disk 60 are formed from black material chosen for absorption of ambient and stray light and for having a temperature expansion coefficient similar to that of the header metal, the glass sleeves and the leads. The disk 60 has index openings 61, 63 and 65 for exposing the upper ends of the leads 42 and 44 and the light-emitting element 24 and for use in orienting the vertical member 28 relative to the light-emitting element during assembly. The opening 65 exposing the light-emitting element 24 has a bevel 67 for accurately positioning the lens 58 (a ball or aspheric lens) which can be bonded by optically clear epoxy to the disk 60.

The light-sensing element 34 has its cathode electrode bonded to a plated conductor pad 62 formed on the vertical member 28. A wire 64 connects the pad 62 and the cathode of the light-sensing element to the header base 48 and the common lead 46. The anode of the light-sensing element 34 is connected by a wire 66 to a conductor trace 68 on the vertical member 28 and a wire 70 connects this conductor 68 to the lead 44 so that the lead 44 is electrically connected to the anode of the light-sensing element 34.

The beam splitter of the embodiment of FIG. 1 is a plate 30 which extends at an acute angle, such as 45°, to the horizontal disk 60 and the vertical member 28 and is bonded such as by optically clear epoxy to the vertical member 28 and the disk 60. The plate 30 is made of light transmitting material such as glass which transmits the light frequency (visible or infrared) emitted by the light-emitting element but reflects a portion of the light. The disk 60 has a groove 72 formed in its upper surface for receiving an edge of the beam splitter plate 30 to assist in properly positioning the plate 30. The upper edge 74 of the vertical member 28 is beveled at the same acute angle as the plate 30 extends for supporting the plate 30 and forming a surface to which the plate 30 can be accurately bonded.

Figure 2:
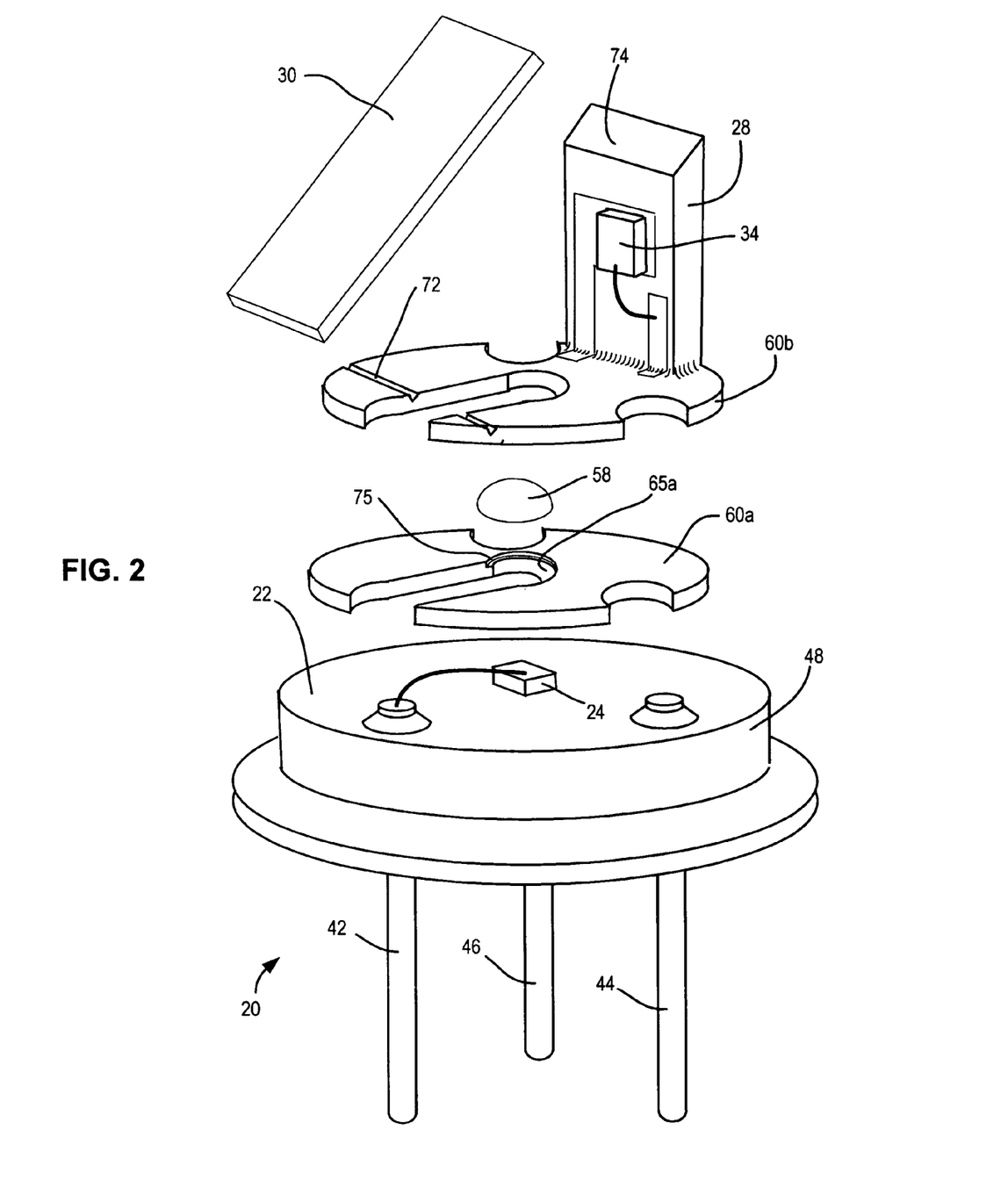
FIG. 2 is a perspective exploded view of several non-assembled elements of a second embodiment of the semiconductor light source with optical feedback in accordance with the invention.

In a variation of the semiconductor light source with optical feedback as illustrated in FIG. 2, a pair of disks 60a and 60b replace the disk 60 of FIG. 1. The lower disk 60a is bonded to the upper surface 22 of the header 20 while the upper disk 60b is bonded on top of the lower disk 60a. These disks 60a and 60b can be formed of black ceramic or plastic or other suitable material. The upper disk 60b can be rotated with respect to the semiconductor light source to maximize the reflectivity of the beam splitter. The lens 58 is positioned in a recess 75 formed around the opening 65a exposing the light emitting element 24 and is bonded on the lower disk 60a. while the vertical member 74 is integral with or bonded on the upper disk 60b. The beam splitter plate positioning groove 72 is formed in the upper disk 60b.

Figure 4:
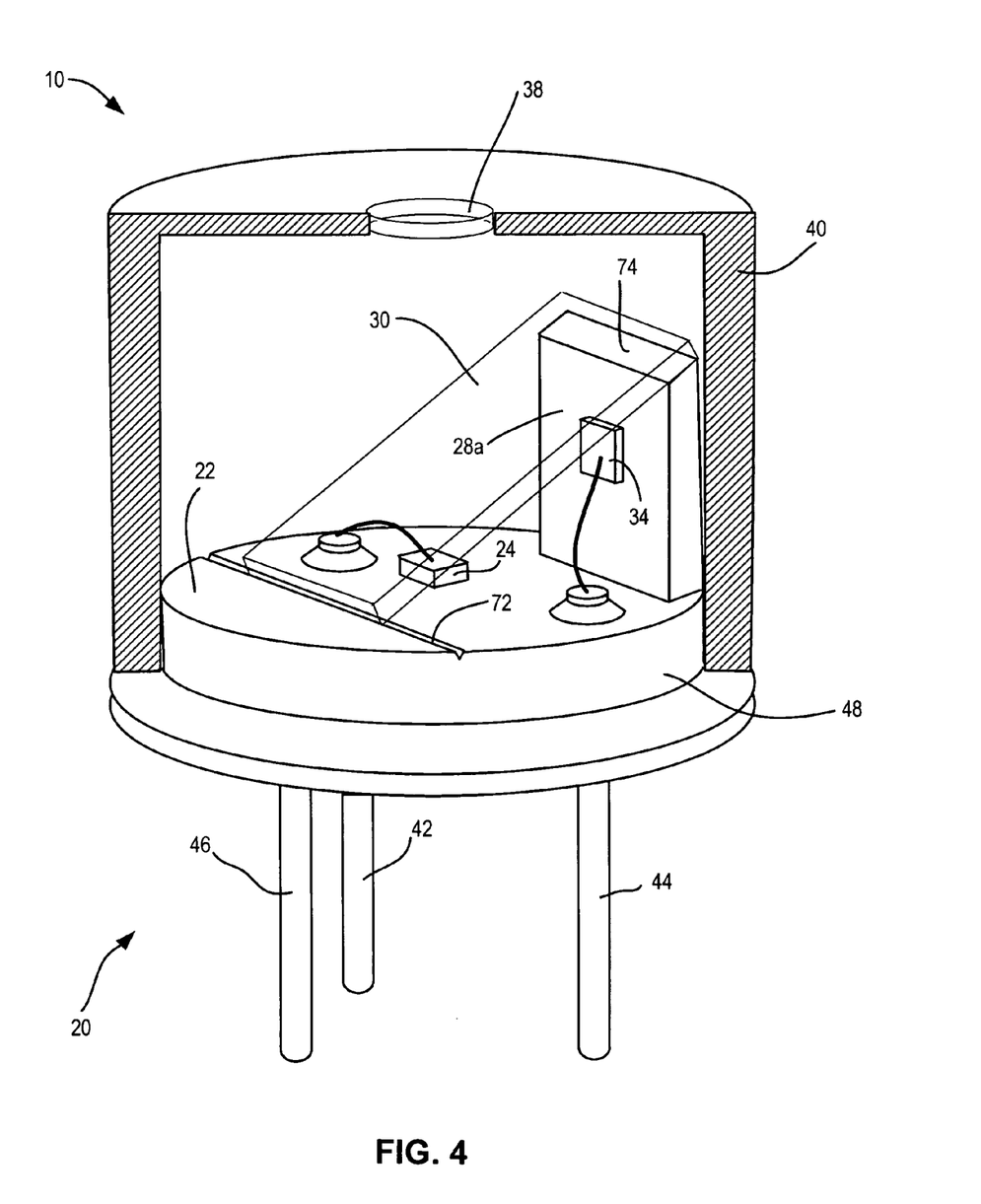
FIG. 4 is a perspective view, with portions cut away, of a third embodiment of the semiconductor light source with optical feedback in accordance with the invention.

In a further variation of the semiconductor light source with optical feedback as illustrated in FIG. 4, a modified vertical member 28a is formed integral with or bonded on the header base 46. The internal surfaces of the structure have a non-reflective (light-absorbing) coating to reduce spurious MD signals. The vertical member 28a can be a conductive metal or plated with a conductive metal to form the electrical connection between the common lead 46 and the cathode of the light-sensing element 34. The groove 72 for assisting in positioning the beam splitter plate 30 is formed in the upper surface 22 of the header base 48.

Figure 5:
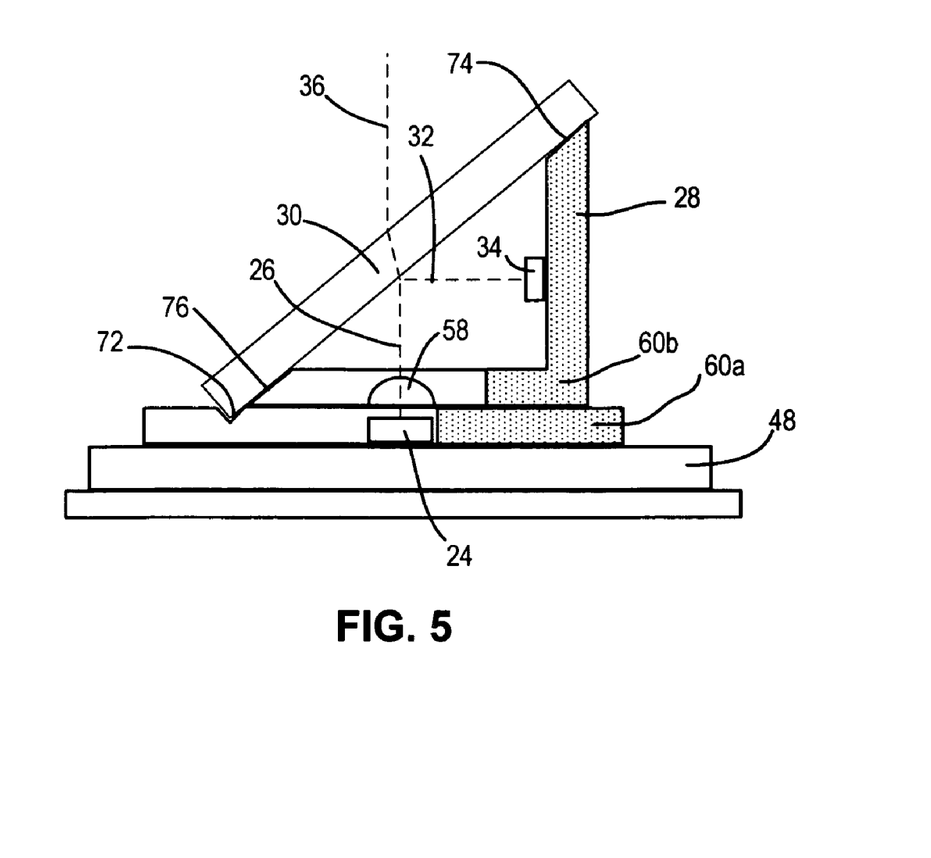
FIG. 5 is an elevation cross-section view of a broken away portion of a fourth embodiment of the semiconductor light source with optical feedback in accordance with the invention.

In still a further variation of the semiconductor light source with optical feedback as illustrated in FIG. 5, the upper disk 60b is formed with a beveled edge 76 for assisting in precisely orienting the beam splitter plate 30. The beveled edges 74 and 76 are formed at the acute angle, such as 45°, to form surfaces to which the beam splitter plate 30 can be bonded such as by optically clear epoxy. It is noted that the vertical member 28 and the upper disk 60b form an L-shaped structure which, for a beam splitter plate orientation of 45°, has arms of equal length terminating in the beveled edges 74 and 76 to precisely orient the beam splitter plate 30. Lengthening or shortening one of the arms of this L-shaped structure changes the angle of orientation if such change is desired. Further in the embodiment of FIG. 5, the groove 72 can be formed in the lower disc 60a. The lower edge of the rectangular beam splitter plate 30 can extend down past the bottom surface of the upper plate 60b so that the groove 72 in the lower disk 60a can be used to orient an assembly of the upper disk 60b, beam splitter plate 30 and light-sensing element 34 relative to the lower disk. Alternatively the groove 72 in the lower plate can be used to position the lower beam splitter plate 30 in place of the beveled edge 76; the vertical member 28 and lower member 60b simply being an L-shaped bracket bonded on the lower disk 60a.

Figure 3:
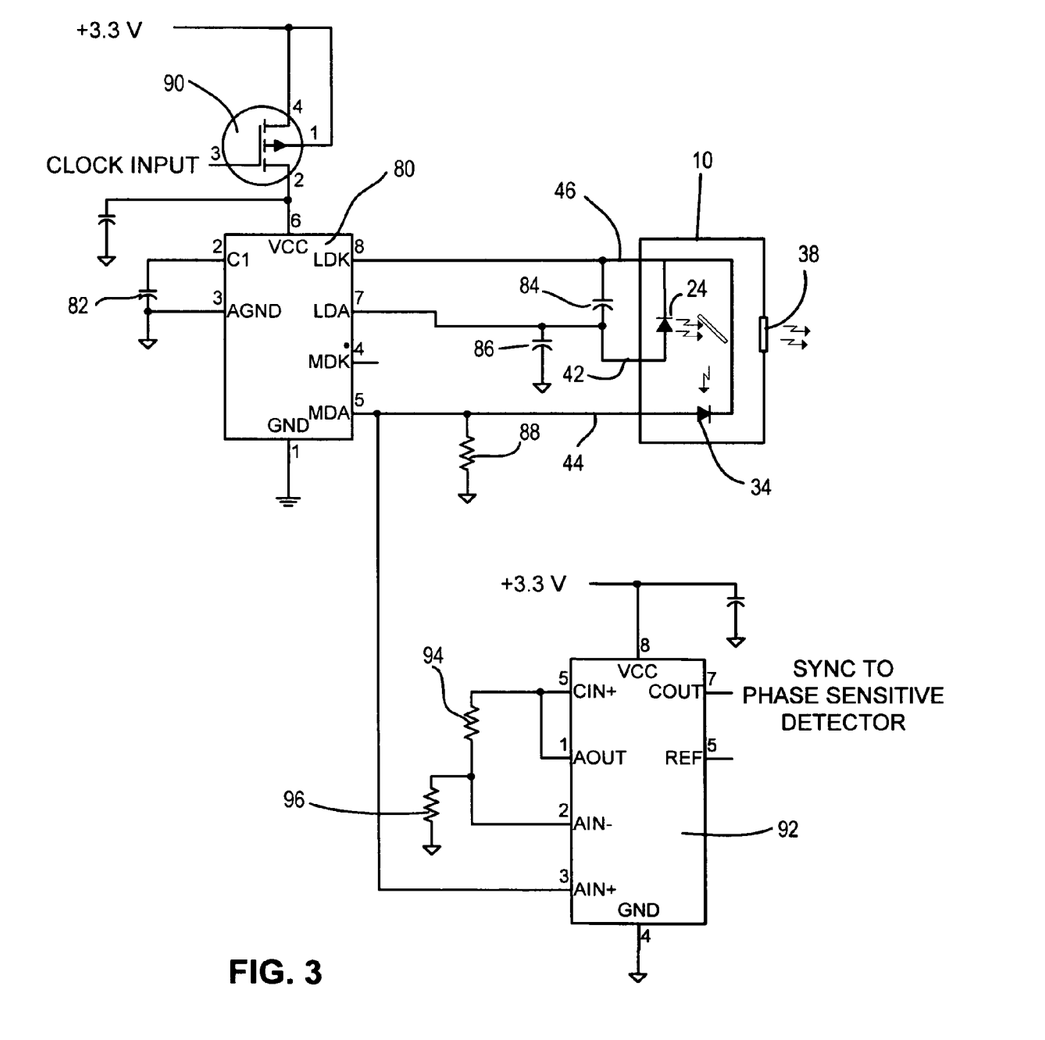
FIG. 3 is a schematic of a portion of an electrical circuit employing a semiconductor light source.

As shown in FIG. 3, the semiconductor light source with optical feedback has the common lead 46 connected of a terminal LDK of a conventional automatic power control integrated circuit 80, has the light emitter anode lead 42 connected to the terminal LDA of the circuit 80 and has the light sensor anode lead 44 connected to the terminal MDA of the circuit 80. This circuit 80 is a commercially available unit IC-WKL or the like which with associated capacitors 82, 84 and 86 and resistor 88 maintains a set light output intensity from the unit 10 by sensing the current through the light-sensing element 34 and adjusting the current through the light-emitting element 24 to maintain the set light output intensity. When the semiconductor light source 10 is employed as a light source for sensing turbidity, fluid borne particles, etc., the input power to the circuit 80 can be turned on and off by a driver 90 to thus produce a pulsed light output from unit 10 and a voltage comparator 92 can be connected to the lead 44 and configured by associated resistors 94 and 96 to produce a sync pulse signal which can be used by a synchronous detector circuit (not shown) to detect turbidity, concentration of fluid borne particles, etc.

Figure 7:
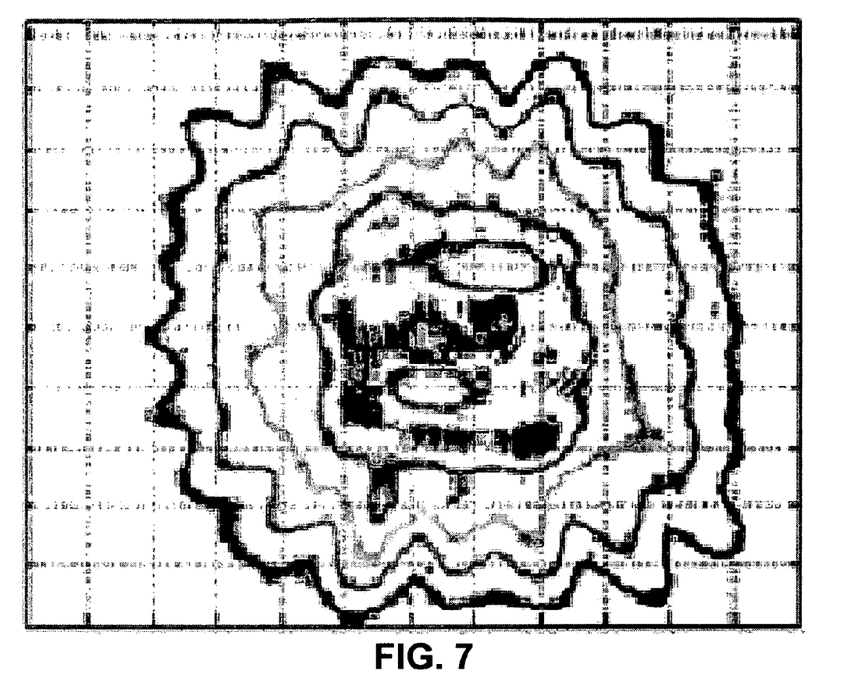
FIG. 7 is a diagram of a pattern of spatial intensity in a cross-section of a light beam emitted by a VCSEL.
Figure 8:
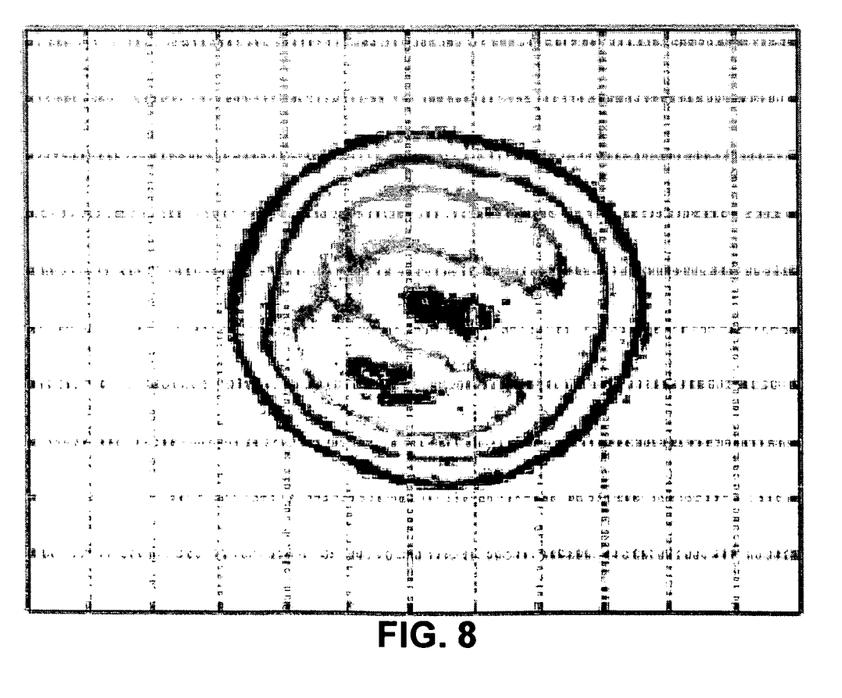
FIG. 8 is a diagram of a pattern of spatial intensity in a cross-section of a light beam emitted by a VCSEL operating under different conditions from FIG. 7.

The light-emitting element 24 is preferably a vertical-cavity surface-emitting laser (VCSEL). A VCSEL emits infrared or visible light from only one surface, the threshold current is only a couple of mA versus 20 to 40 mA for low-power LDs, and the light is coherent and linearly polarized in an approximately 35° circular cone. VCSELs are typically 230×280× 100 μm and they produce one mW of optical power from 3 to 9 mA of current. VCSELs require only an inexpensive lens 58 or beam forming optic (BFO) to form a collimated round beam. The pattern of radiant intensity varies with each VCSEL and is non-linear in spatial distribution within its cone of radiation. Variations in temperature and power level will also change the distribution of power with a VCSEL beam. FIG. 7 is a diagram of spatial intensity distribution in a cross-section of a light beam emitted by a VCSEL energized by 10 mA and operating at 10° C. while FIG. 8 is a diagram of a spatial intensity distribution in a cross-section of light beam emitted by a VCSEL energized by 3 mA and operating at 60° C. In FIGS. 7 and 8, the outer contour represents 5% peak irradiance, the second outer contour represents 20% peak irradiance, the third contour represents 50% peak irradiance and the inner contour represents 75% peak irradiance. It is seen that the cross-sectional distribution of radiation intensity varies with each device and further changes in size and pattern with changes in energizing current and temperature.

Figure 6:
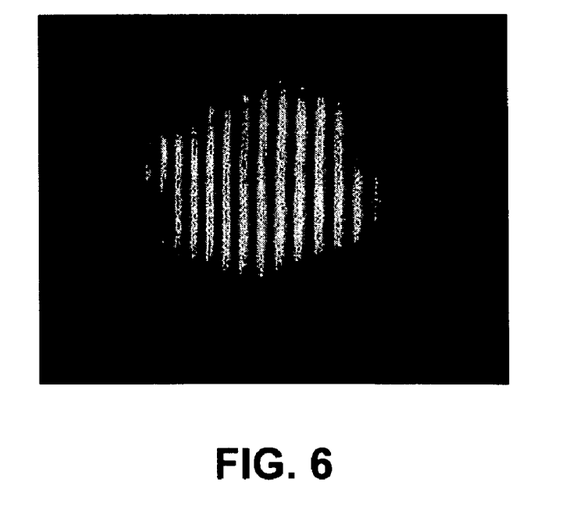
FIG. 6 is an illustration of a light pattern impinging upon a light-sensing element in the unit of the invention.

Prior art APC VCSEL's used MD's (photodiodes) which received only a portion of the light reflected from the exit window and the changes in light intensity distribution with changes in temperature or energizing current resulted in changes in the light received by the MD which did not accurately reflect the changes in overall intensity in the beam irradiance. This results in errors in the sensing of fluid properties. The MD or light-sensing element 34 in the present invention receives substantially all the light reflected transversely by the beam splitter to remove this error of the prior art. FIG. 6 illustrates the pattern of irradiance received by the light-sensing element from the beam splitter plate; interference between reflections by the front and back surfaces of the beam splitter plate results in the pattern being multiple bars which still exhibit the non-uniformity of the cross-sectional pattern of the light beam from the VCSEL.

The light-sensing element 34 is the single-most important element of the automatic power control loop. The light-sensing element must be stable in time and over the range of case temperatures. The latter feature is quantified by the temperature coefficient (t.c.) of responsivity $S(\lambda)$, which is the wavelength-dependent ratio $A \times W^{-1}$ where A=amperes, W=watts of power incident on the light-sensing element, and $\lambda$ is the light wavelength. Silicon photodiodes with temperature coefficients less than 0.01% between 400 and 850 nm are readily available.

Another important attribute is the spatial uniformity of S within the active area. Silicon light sensitive diodes are available with 0.3 to 1% spatial uniformity. An intense spot of irradiance on a photodiode can cause nonlinear responsivity and saturation of the photocurrent with respect to the irradiance. Both features are unsatisfactory in a control loop. The saturation irradiance of silicon photodiodes can be enhanced by several methods known to laser diode manufacturers. Applying a metallic film to the active area to reflect part of the incident radiation away from the depletion zone also is effective but the reflected light cannot be used for power control or other useful purposes, i.e. it is wasted in the present application.

The beam splitter 30 is the second most important element of the power-control loop. It must accurately split off a proportion of the total light power emitted by the VCSEL and deliver it to the light-sensing element 34. The reflectivity of the beam splitter must remain substantially constant over the operating-temperature range (0 to 50° C.) of the device and small changes (±5°) of incidence angle. Moreover, it must do this very precisely to minimize errors resulting from spatial variations of responsivity in the photodiode. A variety of beam splitters can be used but from a cost and performance perspective, a simple plate beam splitter, often called a Fresnel plate beam splitter (FPBS), is the most appropriate. The reflectivity of a Fresnel plate remains substantially the same over the operating-temperature range and small changes of light-incidence angle. A FPBS made of BK7 glass reflects about 10% of the total device radiation to the MD, making it an efficient scheme for APC. The reflectivity of the FPBS is dependent upon the orientation of the VCSEL since its beam is polarized. The orientation of the VCSEL relative to the FPBS should be so that reflectivity is maximized, i.e., the positioning of the VCSEL on the header sets the S-polarized direction of the VCSEL parallel to the short axis of the rectangular FPBS 30. The FPBS should be made of an optical material such as BK7 glass or fused quartz with high surface quality to minimize spurious light diffraction, reflection, and scattering. The light-emitting element 24 must be offset from the center in the device package to account for refraction or lateral displacement of the beam produced by a FPBS. The displacement is about ⅓ of the plate thickness for BK7 glass at a wavelength of 850 nm and 45° FPBS angle relative to the VCSEL beam. Support structures, packaging, and adhesives should be selected to minimize beam movement resulting from mechanical and thermal stresses.

Alternatively, polarization and the resulting interference pattern can be eliminated by using a non-polarizing wedge beam splitter. These non-polarizing beam splitters are more expensive and difficult to mount than the flat plate beam splitter.

The light-sensing element 34 being oriented 90° to the entrance pupil 38 of the unit 10 renders the unit relatively immune to ambient radiation compared with prior art devices; a transversely or perpendicularly mounted photo-diode is exposed to less than 0.4% of the irradiance of an axially mounted photodiode. Further immunity to ambient radiation is produced by making the interior of the cap absorbent or of low-reflectivity material such as anodized aluminum, black plastic or black ceramic. The addition of an interference filter at the entrance pupil 38 of the device reduces the ambient light entering the unit by another 85%. An interference filter, with a central wavelength equal to the emitter is useful in applications where direct illumination predominates. In applications where the diffuse light field is dominant, an absorptive-type filter such as a colored glass or a dichroic filter is more appropriate. An RG780 colored-glass filter is an inexpensive choice. Selection of the filter depends on the relative dominance of direct and diffuse radiation in the ambient (external) light field.

The combined effects of the non-reflective interior of the assembly, the orientation of the light-sensing element 34 to have an acceptance cone perpendicular to the beam axis 26, the small entrance pupil, and the optical filter 38 reduces ambient irradiance on the MD by as much as −75 dB of the level outside the device. This reduces noise and drift in the automatic power control loop to produce a constant intensity light beam.

It is apparent from the above description that many modifications and variations can be made to the described embodiments. For example, a laser diode driver circuit such as the iC WKL chip could be added to the header to integrate the automatic power control circuit in the device. Moreover, the assembly could be made with or without the BFO or lens 58 so that the output beam 36 has a narrow or broad beam divergence.

The invention claimed is:

1. A semiconductor light source with optical feedback comprising:
    a header with three leads and a horizontal upper surface;
    at least two of said leads being insulated from the header and extending through the header to ends above the header upper surface with the third lead being a common lead;
    a semiconductor light-emitting element mounted on the header upper surface and having electrodes electrically connected to one of the insulated leads and the common lead;
    the light-emitting element designed to project a vertical beam of light upward;
    a vertical member projecting upward from the upper surface and having a vertical surface parallel to and horizontally spaced from the vertical beam;
    a light-sensing element mounted on the vertical surface for receiving light transverse to the vertical surface and having electrodes electrically connected to the other insulated lead and the common lead;
    a horizontal disk mounted on the upper header surface and having a through opening exposing the semiconductor light source;
    a collimating lens mounted on the horizontal disk over the semiconductor light source for collimating the vertical beam of light;
    a beam splitter mounted on the vertical member above the light-sensing element and the horizontal disk and extending over light-emitting element for reflecting a portion of the vertical beam of light horizontally onto the light-sensing element wherein substantially all of the transversely reflected light impinges on the light-sensing portion of the light-sensing element; and
    a cap fitted on the header enclosing the light-emitting element, the vertical member, the light-sensing element and the beam splitter and having a window for passing the non-reflected portion of the vertical beam of light.

2. A semiconductor light source as claimed in claim 1 wherein
    the header is gold plated metal and the common lead is joined to the header with electrodes on the light-emitting element and the light-sensing element being electrically connected to the common lead through the header.

3. A semiconductor light source as claimed in claim 1 wherein the vertical member is integral with the horizontal disk, and the vertical member and the horizontal disk are light absorptive.

4. A semiconductor light source as claimed in claim 1 wherein the beam splitter is a plate extending at an acute angle to the upper header surface and the vertical member.

5. A semiconductor light source as claimed in claim 1 wherein the light-emitting element is a vertical cavity surface emitting laser.

6. A semiconductor light source as claimed in claim 4 wherein the vertical member has an upper beveled edge to which the beam splitter plate is mounted.

7. A semiconductor light source as claimed in claim 4 wherein the light-emitting element is offset relative to the center of the cap window to account for refraction by the beam splitter plate of the non-reflected portion of the vertical beam of light.

8. A semiconductor light source as claimed in claim 3 wherein the vertical member and horizontal disk are black ceramic.

9. A semiconductor light source as claimed in claim 4 further including groove means for receiving an edge of the beam splitter plate to assist in positioning the beam splitter plate.

10. A semiconductor light source as claimed in claim 4 wherein the light-emitting element is a vertical cavity surface emitting laser.

11. A semiconductor light source as claimed in claim 4 wherein the beam splitter has a reflectivity which is substantially unchanged by changes in temperature and small changes in angle of incidence.

12. A semiconductor light source as claimed in claim 1 wherein the window in the cap includes a filter for reducing ambient light entering the cap.

13. A semiconductor light source with optical feedback comprising:
a header with three leads and a horizontal upper surface;
at least two of said leads being insulated from the header and extending through the header to ends above the header upper surface with the third lead being a common lead;
a semiconductor light-emitting element mounted on the header upper surface and having electrodes electrically connected to one of the insulated leads and the common lead;
the light-emitting element designed to project a vertical beam of light upward;
first and second horizontal light absorptive disks having through openings exposing the semiconductor light source and the insulated leads; the first disk being mounted on the upper header surface and the second disk being mounted on top of the first disk;
a collimating lens mounted on the first disk over the semiconductor light source;
a vertical member being integral with and projecting upward from the second horizontal disk, the vertical member having a vertical surface parallel to and horizontally spaced from the vertical beam;
a light-sensing element mounted on the vertical surface for receiving light transverse to the vertical surface and having electrodes electrically connected to the other insulated lead and the common lead;
a beam splitter mounted on the vertical member above the light-sensing element and extending over light-emitting element for reflecting a portion of the vertical beam of light horizontally onto the light-sensing element wherein substantially all of the transversely reflected light impinges on the light-sensing portion of the light-sensing element; and
a cap fitted on the header enclosing the light-emitting element, the vertical member, the light-sensing element and the beam splitter and having a window for passing the non-reflected portion of the vertical beam of light.

14. A semiconductor light source as claimed in claim 13 wherein the first and second light absorptive disks are black ceramic.

15. A semiconductor light source as claimed in claim 13 wherein the upper end of the vertical member is beveled, an edge of the second horizontal disk is beveled, and the beam splitter is a beam splitter plate mounted at opposite ends on the beveled end of the vertical member and the beveled edge of the second horizontal disk to extend at an acute angle over the light emitting element.

16. A semiconductor light source as claimed in claim 15 wherein the first horizontal light absorptive disk has a groove therein for receiving an edge of the beam splitter plate to assist in positioning the beam splitter plate.

17. A semiconductor light source as claimed in claim 13 wherein the beam splitter is a beam splitter plate extending at an acute angle between the vertical member and the second light absorptive disk.

18. A semiconductor light source as claimed in claim 17 wherein the vertical member has a upper beveled edge to which the beam splitter plate is mounted.

19. A semiconductor light source with optical feedback comprising:
a header with three leads and a horizontal upper surface;
at least two of said leads being insulated from the header and extending through the header to ends above the header upper surface with the third lead being a common lead;
a semiconductor light-emitting element mounted on the header upper surface and having electrodes electrically connected to one of the insulated leads and the common lead;
the light-emitting element designed to project a vertical beam of light upward;
a vertical member projecting upward from the upper surface and having a vertical surface parallel to and horizontally spaced from the vertical beam;
a light-sensing element mounted on the vertical surface for receiving light transverse to the vertical surface and having electrodes electrically connected to the other insulated lead and the common lead;
a beam splitter mounted on the vertical member above the light-sensing element and extending over light-emitting element for reflecting a portion of the vertical beam of light horizontally onto the light-sensing element wherein substantially all of the transversely reflected light impinges on the light-sensing portion of the light-sensing element, the beam splitter being a plate extending as an acute angle to the upper header surface and the vertical member;
the vertical member having a upper beveled edge to which the beam splitter plate is mounted; and
a cap fitted on the header enclosing the light-emitting element, the vertical member, the light-sensing element and the beam splitter and having a window for passing the non-reflected portion of the vertical beam of light.

20. A semiconductor light source as claimed in claim 19 wherein the window in the cap includes a filter for reducing ambient light entering the cap.

* * * * *